United States Patent [19]
Yokoyama et al.

[11] 4,292,533
[45] Sep. 29, 1981

[54] MOTORING CONTROL FOR HYDRAULIC PUMP-TURBINE

[75] Inventors: Toshiaki Yokoyama, Hitachi; Akira Hara, Hitachiota; Takeshi Okuyama, Hitachi, all of Japan

[73] Assignee: Hitachi, Ltd., Tokyo, Japan

[21] Appl. No.: 967,516

[22] Filed: Dec. 7, 1978

[30] Foreign Application Priority Data

Dec. 9, 1977 [JP] Japan ................................ 52/147111

[51] Int. Cl.³ ............................................ G05D 13/02
[52] U.S. Cl. ...................................... 290/40 B; 290/52
[58] Field of Search ............................. 290/40, 51, 52

[56] References Cited

U.S. PATENT DOCUMENTS

| | | | |
|---|---|---|---|
| 3,892,978 | 7/1975 | Haley | 290/40 A X |
| 3,943,371 | 3/1976 | Yannone et al. | 290/40 B |
| 4,019,315 | 4/1977 | Yannone et al. | 290/40 A X |
| 4,103,178 | 7/1978 | Yannone et al. | 290/40 R |

*Primary Examiner*—J. V. Truhe
*Assistant Examiner*—W. E. Duncanson, Jr.
*Attorney, Agent, or Firm*—Thomas E. Beall, Jr.

[57] ABSTRACT

A prime mover control apparatus for controlling a primer mover including a pump turbine or a water turbine driving a generator to be synchronously connected to a power system, is disclosed. In this control apparatus, immediately after the synchronous connection of the generator to the power system, the opening of the guide vanes of the turbine is increased to exceed a predetermined value at which the turbine is not placed in the motoring mode, and then, the speed governor is controlled to drive the turbine at the speed corresponding to the standard frequency of the voltage in the power system.

5 Claims, 2 Drawing Figures

MOTORING CONTROL FOR HYDRAULIC PUMP-TURBINE

FIELD OF THE INVENTION

This invention relates to prime mover control apparatus, and more particularly to an apparatus which controls a prime mover including a water turbine or a pump turbine (generally referred to hereinafter as a turbine) driving a generator in a power plant so that the turbine may not operate in the reverse or pumping direction when it is operating in the generating mode.

DESCRIPTION OF THE PRIOR ART

Figure 1:
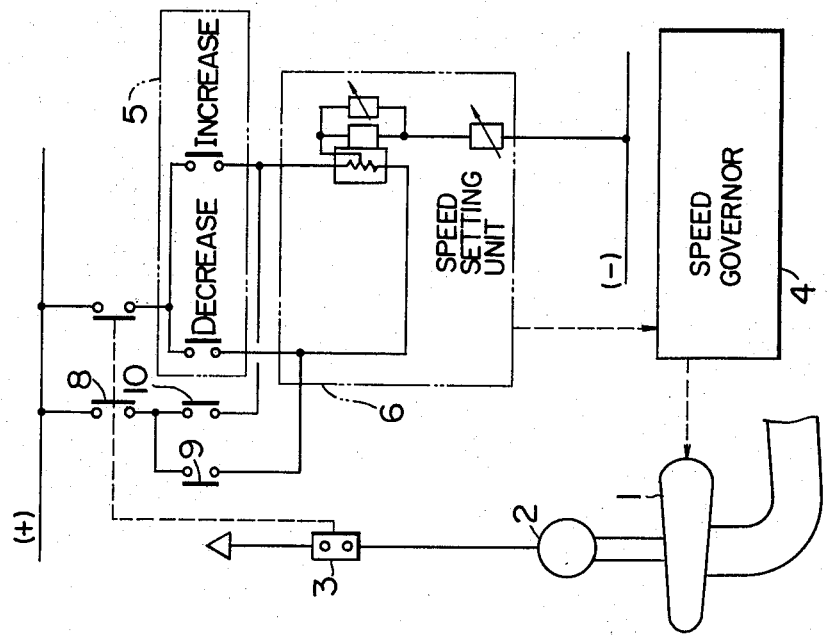
FIG. 1 is a system diagram of a prior art prime mover control apparatus.

A prime mover control apparatus having a structure as shown in FIG. 1 has been widely used hithertofor controlling a turbine operating in its generating mode to drive a generator in a power plant.

In FIG. 1, a turbine 1 rotates in its generating direction to drive a generator 2 which is to be synchronously connected to a power system. According to the prior art practice, an automatic parallel-connection unit 5 regulates a speed setting unit 6 associated with a speed governor 4 to control the rotation speed of the turbine 1, and a synchronous on-off unit 3 is operated to connect the generator 2 to the power system when the amplitude, frequency and phase of the voltage generated by the generator 2 attain values falling within predetermined ranges very close to the respective values of the voltage in the power system. The synchronous on-off unit 3 has a contact 8 at which on-off of the synchronous on-off unit 3 is detected. This contact 8 is connected to contacts 9 and 10 which act to reset the speed setting in the speed setting unit 6 to the value at which the turbine 1 can rotate at the speed corresponding to the standard frequency of the voltage in the power system after the generator 2 has been connected to the power system by the synchronous on-off unit 3. Thus, when, for example, the generator 2 is connected to the power system by the synchronous on-off unit 3 in the condition in which the frequency of the voltage generated by the generator 2 is higher than the standard frequency of the voltage in the power system, the speed setting in the speed setting unit 6 is reset to the value corresponding to the standard frequency of the power system voltage by means of the contacts 9 and 10, and the speed governor 4 acts to urge the guide vanes of the turbine 1 in their closing direction thereby decreasing the rotation speed of the turbine 1.

When the guide vanes of the turbine 1 are urged in their closing direction to decrease the rotation speed of the turbine 1, the pressure of water in the penstock will be subject to a variation although this pressure variation depends upon the opening of the guide vanes, and reverse flow of water toward a pump tends to occur in view of the operating characteristics of the turbine 1. In other words, the turbine 1 and the generator 2 tend to operate in the motoring mode in which the turbine 1 operates in the reverse direction to act as a pump. When this motoring occurs, power amounting to a substantial proportion of the system power output will flow backward from the power system into the generator 2 thereby greatly adversely affecting the steady operation of the power system, and once the prime mover is placed in the motoring mode, the desired power generation will become substantially impossible unless the prime mover is stopped.

SUMMARY OF THE INVENTION

It is a primary object of the present invention to obviate the prior art defect pointed out above and to provide an improved prime mover control apparatus which is capable of ensuring stable operation of the prime mover without placing the turbine in its motoring mode at the time of synchronous connection of the generator to the power system.

In accordance with the present invention which attains the above object, there is provided a prime mover control apparatus comprising a prime mover including a turbine driving a generator which is to be synchronously connected to a power system by a synchronous on-off unit, a speed governor governing the speed of the prime mover, and a speed setting unit associated with the speed governor, means for detecting the position of the guide vanes of the turbine, the guide vane position detecting means being operatively connected to the speed setting unit associated with the speed governor so that, immediately after the synchronous connection of the generator to the power system by the synchronous on-off unit, the opening of the guide vanes of the turbine is increased to exceed a predetermined value at which the turbine is not placed in the motoring mode, and then, the speed setting in the speed setting unit associated with the speed governor is reset to the value corresponding to the standard frequency of the voltage in the power system.

In other words, in the apparatus according to the present invention, the synchronous connection of the generator to the power system by the synchronous on-off unit is detected, and immediately after the synchronous connection of the generator to the power system, the opening of the guide vanes of the turbine detected by the guide vane position detector is increased up to a range in which the reverse flow of water, that is, the motoring operation tending to occur according to the operating characteristics of the turbine does not take place. Subsequently, the speed setting unit associated with the speed governor is actuated to reset the speed setting of the speed governor to the value corresponding to the standard frequency of the voltage in the power system. This guide vane opening is set at a predetermined value which can sufficiently deal with water pressure pulsation in the water passage system.

Figure 2:
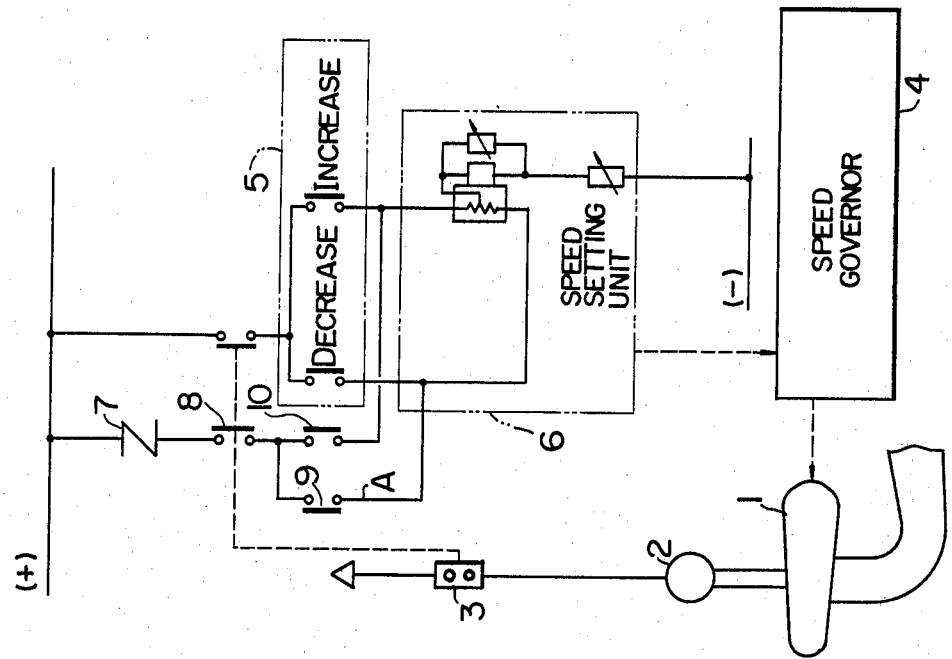
FIG. 2 is a system diagram of an embodiment of the prime mover control apparatus according to the present invention.

The features and advantages of the present invention will be more clearly understood from the following description of a preferred embodiment shown in FIG. 2.

DESCRIPTION OF THE PREFERRED EMBODIMENT

A preferred embodiment of the present invention will be described with reference to FIG. 2 in which the same reference numerals are used to denote the same parts appearing in FIG. 1. The apparatus shown in FIG. 2 differs from that shown in FIG. 1 in that a guide vane position detector 7 is connected to the contact 8 of the synchronous on-off unit 3. This guide vane position detector 7 detects a predetermined opening or position of the guide vanes of the turbine 1 at which position the turbine 1 and the generator 2 would not be placed in the motoring mode even when the factors including the operating characteristics of the turbine 1 and the water pressure pulsation in the penstock are taken into account. In operation, the synchronous connection of the generator 2 to the power system by the synchronous on-off unit 3 is detected at the contact 8 of the synchronous on-off unit 3, and immediately after the synchronous connection of the generator 2 to the power system, the opening of the guide vanes of the turbine 1 is increased to exceed the predetermined value at which the motoring operation of the turbine 1 does not take place. The guide vane position detector 7 detects that the guide vanes of the turbine 1 have been opened to the predetermined position, and at the same time, the automatic parallel-connection unit 5 and the speed setting unit 6 are actuated to control the speed governor 4 so that the turbine 1 can rotate at the speed corresponding to the standard frequency of the voltage in the power system. Thus, the turbine 1 and the generator 2 can stably operate without being placed in the motoring mode. The guide vane position detector 7 may be disposed at a position A between the speed setting unit 6 and the contact 9 which is provided for resetting the speed setting to the value corresponding to the standard frequency of the voltage in the power system, in lieu of the position illustrated in FIG. 2. In such a case too, the motoring operation preventing effect of the present invention is similarly attained. The above effect may also be expected when the guide vanes of the turbine 1 are designed to open and close at a suitably selected slow rate after the synchronous connection of the generator 2 to the power system by the synchronous on-off unit 3, taking the operating characteristics of the generator 2 into account.

It will be understood from the foregoing description that the present invention obviates the undesirable motoring of the turbine tending to occur at the time of the synchronous connection of the generator to the power system, so that the prime mover can stably operate without being placed in the motoring mode, and the output losses of the power system can be eliminated.

What is claimed is:

1. In a hydraulic turbine control apparatus comprising a prime mover including an electric generator, and a hydraulic turbine having movable guide vanes, drivingly connected to said generator; means to synchronously electrically connect said motor-generator to an electric power system including a synchronous on-off unit; a speed governor governing the speed of said prime mover; and a speed setting unit associated with said speed governor, wherein the improvement comprises:

means for detecting the position of the guide vanes of said turbine;

said guide vane position detecting means being operatively connected to said speed setting unit associated with said speed governor for increasing the opening of said guide vanes immediately after the synchronous connection of said generator to said power system by said synchronous on-off unit, to override said speed governor and to exceed a fixed opening value at which said turbine is not placed in the motoring mode; and means for thereafter resetting the speed setting in said speed setting unit associated with said speed governor to the value corresponding to the standard frequency of the voltage in said power system and returning control of the opening of said movable guide vanes to said speed governor.

2. A prime mover control apparatus as claimed in claim 1, wherein said synchronous on-off unit includes a contact closed in response to the synchronous connection of said generator to said power system, and said guide vane position detecting means is connected between said power system and said speed setting unit through said contact.

3. A prime mover control apparatus as claimed in claim 1, wherein said means for resetting includes an electrical contact associated with said speed setting unit, and said guide vane position detecting means is connected between said speed setting unit and said contact.

4. A method of operating a hydraulic turbine control apparatus, comprising the steps of:

providing a prime mover including an electric generator and a hydraulic turbine having movable guide vanes and being drivingly connected to said generator;

providing means to synchronously electrically connect said generator to an electric power system including a synchronous on-off unit;

providing a speed governor governing the speed of said prime mover;

providing a speed setting unit associated with said speed governor;

detecting the position of the guide vanes of said turbine;

synchronously connecting said generator electrically to said power system by said synchronous on-off unit;

immediately after said synchronous connection and in cooperation with said detecting, operating said speed setting unit associated with said speed governor to override said speed governor and increase the opening of said guide vanes to exceed a fixed opening value at which said turbine is not placed in the motoring mode; and thereafter resetting the speed setting in said speed setting unit associated with said speed governor to the value corresponding to the standard frequency of the voltage in said power system and returning control from the opening of said movable guide vanes to said speed governor.

5. The method according to claim 4, wherein said fixed value corresponds to the position of said guide vanes with said turbine-generator being synchronously electrically connected to said power system without any substantial amount of power being transferred between said generator and said power system, so that said method of operating will prevent said prime mover from entering a motoring mode of operation defined by a substantial amount of power being transferred from said power system to said generator when it is first synchronously connected to said power system.

* * * * *